A. W. SAWYER.
Improvement in Sewing-Machine Driving-Wheels.

No. 127,434. Patented June 4, 1872.

WITNESS. INVENTOR.

UNITED STATES PATENT OFFICE.

ABNER W. SAWYER, OF CLEVELAND, OHIO.

IMPROVEMENT IN SEWING-MACHINE DRIVING-WHEELS.

Specification forming part of Letters Patent No. 127,434, dated June 4, 1872.

SPECIFICATION.

I, ABNER W. SAWYER, of Cleveland, in the county of Cuyahoga and State of Ohio, have invented a new and useful Attachment to be applied to Sewing-Machine Driving-Wheels for shortening the crank, of which the following is a specification:

This invention relates to an attachment to be secured to the hub and wrist-pin stud, by which the crank may be shortened to give less motion to treadles, this being adapted to the Sapp treadle, which requires less motion than the common treadle. Some machines—as, for instance, the Weed—have more stroke than is required when using the alternate-motion treadle; hence the necessity of this attachment to adapt the Sapp treadle to machines, as aforesaid.

Figure 1:
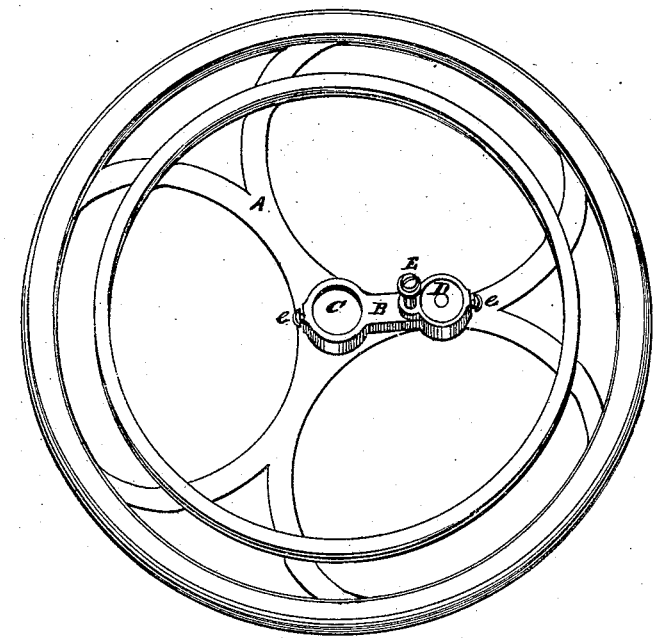
Figure 2:
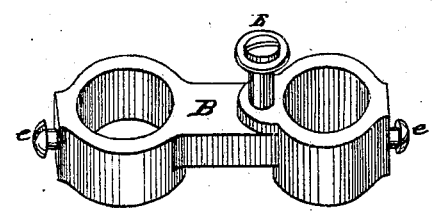

In the drawing, Figure 1 is a plan of a sewing-machine wheel having my improvement attached. Fig. 2 is a detached view of my improved crank-shortener.

A, Fig. 1, represents a sewing-machine driving-wheel. B, Figs. 1 and 2, represents a bar of iron having an eye in each end, one of which fits over the hub C of the wheel A, the other over the wrist-pin stud D, and is secured in place by set-screws $e$ $e$. The wrist-pin E, on which the pitman plays, is screwed into the bar B a short distance from the stud, by which the distance from the center of the hub C and the wrist-pin is shortened, thus shortening the crank, and thereby shortening the stroke of the pitman; the object of this being, as aforesaid, to adapt certain machines to the Sapp alternate-motion treadle.

I claim—

The bar B, having the eyes or slots in the ends, and the pin E, in combination with the hub C and wrist-pin stud D of a sewing-machine driving-wheel, as shown and described, and for the purpose set forth.

ABNER W. SAWYER.

Witnesses:
GEO. W. TIBBITTS,
STILES H. CURTISS.